UNITED STATES PATENT OFFICE 2,509,745

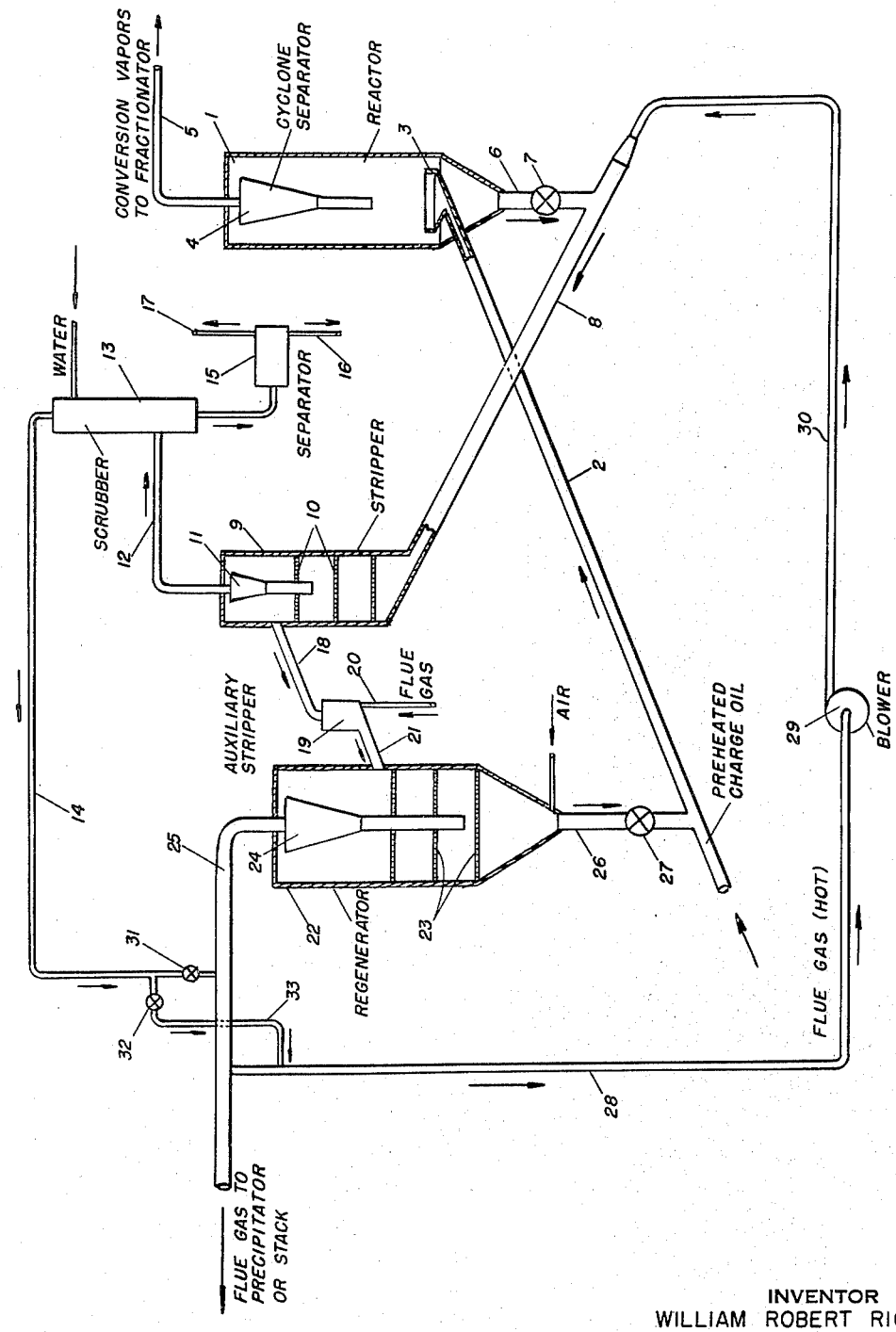

FLUIDIZED CATALYST PROCESS FOR CONVERSION OF HYDROCARBONS

William R. Riggs, Flossmoor, Ill., assignor to Sinclair Refining Company, New York, N. Y., a corporation of Maine Application April 30, 1947, Serial No. 744,911

2 Claims. (Cl. 196—52)

This invention relates to the pyrolytic conversion of hydrocarbons and, more particularly, to pyrolytic conversion processes involving the use of a finely divided catalyst.

The invention is especially applicable to conversion processes of the general type wherein a finely divided catalyst at elevated temperature is suspended in oil vapors, passed to a reactor in which conversion of the oil occurs, and in which the spent catalyst is separated from the oil vapors, the separated catalyst stripped of oil, regenerated by burning off coke or carbon deposited thereon and the regenerated catalyst again suspended in the stream of oil vapors passing to the reactor.

Operations of the type described are commonly designated fluid catalyst processes. In conventional operation, the separated catalyst passes from the bottom of the reactor through a stripper column, extending downwardly from the lower end of the reactor and in which the catalyst is contacted with steam for the purpose of removing or stripping from the catalyst oil remaining thereon. The steam used for stripping, together with the stripped oil vapors, normally passes upwardly from the stripper column into the reactor. The stripped catalyst passes from the bottom of the stripper and is picked up by a stream of air and conveyed thereby into the bottom of the regenerator.

It has been found that the presence of steam in the reactor detrimentally affects the activity and life of the catalyst and capacity of the reactor. Further, contact by air with the catalyst before the latter has been thoroughly stripped of oil results in a loss of oil through burning and frequently an over-burning of the catalyst itself.

In accordance with my present invention, the detrimental affect of steam on the catalyst is avoided with a resultant higher catalytic activity and longer catalyst life and higher reactor capacity is attained. Further, the catalyst is not exposed to air or other oxidizing gases until it has been substantially completely freed of oil, thus avoiding loss of oil by burning and at the same time avoiding over-burning of the catalyst, which further contributes to the catalytic activity and life.

The present invention provides an improved process adapted to continuous operation and comprising a plurality of cooperating steps so coordinated as to constitute a unitary operation in which a charge of catalyst is repeatedly used and intermittently regenerated and returned to the cracking zone with increased catalyst activity and length of life and conservation of valuable hydrocarbons.

Other advantages derived from my invention will appear from the following detailed description of its application to a fluid catalyst cracking operation with reference to the accompanying drawing which represents conventionally and diagrammatically a flow diagram of the operation.

Referring more particularly to that embodiment of my invention shown in the accompanying drawing, the apparatus indicated by the reference numeral 1 represents a generally cylindrical reactor of conventional type. The finely divided catalyst suspended in oil vapor enters the reactor through conduit 2, extending into the reactor and terminating in a conical member 3 of somewhat smaller diameter than the reactor and opening into the reactor through a conventional grid. As the hot oil vapors pass upwardly through the reactor, there is a tendency for the catalyst to drop out of suspension forming a so-called "high density" or "dense phase" fluidized body of catalyst in the reactor which flows downwardly through the annular space between the member 3 and the walls of the reactor.

Oil vapors, product of the conversion, rise to the top of the reactor, pass through a cyclone type separator 4, to remove suspended catalyst from the vapors, the latter passing therefrom through conduit 5 to fractionating apparatus, not shown, and the separated catalyst dropping back into the dense phase body of catalyst in the reactor.

Spent catalyst is withdrawn from the bottom of the reactor through the spent catalyst leg 6, advantageously of sufficient length that the dense body of catalyst therein forms an effective seal against the upward passage of conveying medium into the reactor, and in which there is interposed a conventional valve arrangement indicated at 7 for controlling the downward flow of the catalyst, advantageously of the slide valve type. From thence, the spent catalyst flows into conduit 8 where it is picked up by a current of hot products of combustion from the regenerator, presently to be described, and carried up into the bottom of the stripper 9.

Oil is partially stripped from the catalyst in transit to the stripper and further stripping is thereafter effected in the stripper. The stripper 9 is provided with a plurality of baffles or perforated partitions 10, adapted to retard the passage of the catalyst upwardly through the stripper, to promote uniform and prolonged contact between the catalyst and the flue gases supplied through conduit 8 and to minimize top-to-bottom mixing.

The gaseous products pass from the top of the stripper through a cyclone type separator 11, for separation of suspended catalyst, and out through conduit 12 to scrubber 13. In the scrubber, the gases admixed with vapors of oil stripped from the spent catalyst are scrubbed with a scrubbing menstruum, for instance, water, to separate valuable hydrocarbons from the incondensible gases. The scrubbed gases pass out through conduit 14 and the scrubbing menstruum and recovered hydrocarbons pass to separator 15 from which the menstruum and heavier hydrocarbons pass through conduit 16 and the light hydrocarbon vapors pass overhead through conduit 17. The heavier hydrocarbons may be separated and returned to the system for retreatment, together with fresh charge.

The hot gases, passing upwardly through the stripper, strip from the catalyst the major portion of vaporizable hydrocarbons contained therein and carry the catalyst upwardly through the stripper. A relatively dense bed of the catalyst accumulates in the stripper and overflows therefrom through exit 18 into an auxiliary stripper 19, through which the catalyst flows countercurrent to a stream of hot gases, advantageously hot products of combustion from the regenerator, introduced at 20, by which further stripping of the catalyst is accomplished. The hot gases and vapors from the auxiliary stripper pass into stripper 9 and the catalyst flows by gravity through conduit 21 into the upper part of the regenerator 22. The auxiliary stripper may frequently be omitted.

The regenerator is advantageously provided with baffles or perforated partitons 23, designed to retard the downward passage of the catalyst, to promote uniform and prolonged contact with air or other oxidizing gas introduced into the lower part of the regenerator, and to minimize top-to-bottom mixing. Upon contact of the air with the hot catalyst, the coke or carbon deposited on the catalyst is burned as the catalyst moves gradually downwardly through the regenerator. The oxygen of the air is gradually consumed as it passes upwardly through the catalyst, the air richest in oxygen being permitted contact only with catalyst which has been partially freed of carbon and therefore is lean in oxidizable material. The gases upon reaching the top of the catalyst bed are substantially free from oxygen and serve completely to strip from the catalyst any remaining vaporizable hydrocarbons, thus reducing the amount of burning required in the regeneration of the catalyst. From the upper end of the regenerator, the hot products of combustion pass through the cyclone type separator 24 and out through conduit 25.

The regenerated catalyst gravitates downwardly forming a relatively dense fluidized bed of catalyst in the regenerator and passes downwardly therefrom through the regenerated catalyst leg 26, similar to leg 9, having interposed therein a valve arrangement 27, for instance, a slide valve of conventional type. From thence, the regenerated catalyst flows into the lower end of conduit 2 where it is picked up by the vaporized or partially vaporized oil charge and returned to the reactor.

A portion of the hot products of combustion, or flue gases, leaving the regenerator through conduit 25 is passed through conduit 28 to blower or booster 29 and, from thence, through conduit 30 into conduit 8 where it picks up the spent catalyst and carries it to the stripper, as previously described.

The gases passing from the scrubber through conduit 14 may be admixed with the main stream of flue gases from the regenerator or may be used to temper the gases passing to blower 29 by closing valve 31 and opening valve 32 in by-pass line 33 leading to conduit 28. Other means for controlling the temperature of the gases passing to the blower may be employed.

The amount of air passed through the regenerator for burning the carbon or coke deposited on the catalyst is with advantage so regulated that the oxygen thereof is substantially completely consumed in passing upwardly through the catalyst so that the hot flue gases passing from the top of the regenerator are substantially free from uncombined oxygen.

In accordance with my present invention I utilize a portion of the heat contained in the hot flue gases to effect the stripping of oil from the spent catalyst. By employing the hot flue gases in this manner, I not only conserve heat, but I also avoid the use of the customary steam and its detrimental effect on the activity and life of the catalyst. The hot flue gases may be used not only as a conveyor for carrying the spent catalyst from the reactor to the stripper and for effecting the major stripping of the catalyst, but are also used with advantage as a source of hot gases for use in the auxiliary stripping operation, previously described.

By reason of the countercurrent flow of the catalyst and air through the regenerator, a more uniform regeneration of the catalyst is effected, the required amount of air materially reduced and the danger of overburning the catalyst minimized. The substantially complete removal of the vaporizable hydrocarbons from the catalyst before contact with the air further promotes these desirable conditions.

Further, according to my invention, the use of steam in contact with the catalyst may be completely avoided and such oxygen as is used is injected at a point where it is more effectively utilized. Also, residual oil in the catalyst, which is normally burned with the coke, is more efficiently recovered and may be recycled to the zone of reaction.

The catalyst employed may be of the type conventionally used in fluid catalyst processes, for instance, a silica-alumina type catalyst in finely divided or powdered form. The reaction conditions may likewise be those conventionally used in operations of this type, and as understood by the art, the optimum temperatures and pressures will depend primarily upon the type of feed stock used, the particular catalyst employed and the reaction desired.

In cracking gas oil, for instance, the reaction temperature may with advantage, be within the range of 800° to 1,000° F. and the pressure at the top of the reactor within the range of about 5 to 25 pounds per square inch. The regeneration temperature may be within the range of 950° to 1,200° F., heat for the reaction being supplied largely by the hot catalyst passing to the charge oil from the regenerator.

The flue gases passing from the regenerator will usually be under a pressure of about five pounds or less per square inch and this pressure is with advantage boosted to, say, fifteen to twenty-five pounds per square inch by the blower.

It will be understood that the present invention is not restricted to the particular embodiment thereof herein described but is applicable to various modifications of fluid catalyst processes.

I claim:

1. In the fluid catalyst process for the conversion of hydrocarbons wherein dense phase bodies of fluidized catalyst are maintained in a reaction zone and in a regenerating zone, respectively, the catalyst is continuously regenerated in the regenerating zone by contact with air under conditions adapted to avoid excessive rise in temperature, regenerated catalyst is withdrawn from the body of catalyst in the regenerating zone and passed to the reaction zone, catalyst is continuously withdrawn from the body of catalyst in the reaction zone, stripped of oil in a stripping zone by contact with a stripping medium and returned to the body of catalyst in the regenerating zone, the improvement which comprises regenerating the catalyst by passing it downwardly through the regenerating zone while passing air upwardly through the regenerating zone in contact with the catalyst in proportions such that the effluent flue gases are substantially free from uncombined oxygen, withdrawing catalyst by gravity from the body of catalyst in the reaction zone, suspending the withdrawn catalyst in effluent gases from the regenerating zone and conveying it thereby to a stripping zone separate from the reaction zone and from which the passing of stripping medium to the reaction zone is prevented, stripping the catalyst in the stripping zone by contact with the gaseous conveying medium and passing the stripped catalyst by gravity from the stripping zone to the upper portion of the dense phase body of catalyst in the regenerating zone.

2. The process of claim 1 in which the effluent gases from the regenerating zone used as the conveying and stripping medium are tempered by mixing therewith a portion of the effluent gases from the stripping zone from which the major portion of the hydrocarbons has been separated.

WILLIAM R. RIGGS.

REFERENCES CITED

The following references are of record in the file of this patent:

UNITED STATES PATENTS

| Number | Name | Date |
|---|---|---|
| 2,289,329 | Prickett | July 7, 1942 |
| 2,367,281 | Johnson | Jan. 16, 1945 |
| 2,384,356 | Tyson | Sept. 4, 1945 |
| 2,408,943 | Mekler | Oct. 8, 1946 |
| 2,414,852 | Burnside et al. | Jan. 28, 1947 |
| 2,444,832 | Krebs | July 6, 1948 |
| 2,447,116 | Collins | Aug. 17, 1948 |

OTHER REFERENCES

Walter: "Journal of the Institute of Petroleum," vol 32, No. 270, June 1946, pages 295–303.